United States Patent [19]
Lo

[11] Patent Number: 5,667,294
[45] Date of Patent: Sep. 16, 1997

[54] STRIP SPORT LIGHT

[76] Inventor: Robin Lo, 12309 Terrence Ave., Saratoga, Calif. 95070

[21] Appl. No.: 289,657

[22] Filed: Aug. 12, 1994

[51] Int. Cl.⁶ .................................................. F21V 21/00
[52] U.S. Cl. .......................... 362/250; 362/105; 362/106; 362/234; 362/800
[58] Field of Search ........................... 362/103, 104, 362/105, 108, 234, 800, 250, 251, 806, 106

[56] References Cited

U.S. PATENT DOCUMENTS

| | | |
|---|---|---|
| 3,676,664 | 7/1972 | Corvetti ................................. 362/105 |
| 4,254,451 | 3/1981 | Cochran, Jr. ........................... 362/103 |
| 5,434,759 | 7/1995 | Endo et al. ......................... 362/103 X |

*Primary Examiner*—Stephen F. Husar
*Attorney, Agent, or Firm*—The Kline Law Firm

[57] ABSTRACT

A strip sport light including a center strip and two arm strips with multiple electrical light sources for illumination and blinking. Each arm strip has one or more distributed electrical energy sources each enclosed in an aerodynamic housing, and multiple electrical light sources distributed along the length of the arm strip. The center strip contains an electronic printed circuit board, a three-step push button switch, and multiple electrical light sources. The strip sport light may be mounted on a bicycle helmet or worn on a user's head or waist for enhanced safety.

4 Claims, 3 Drawing Sheets

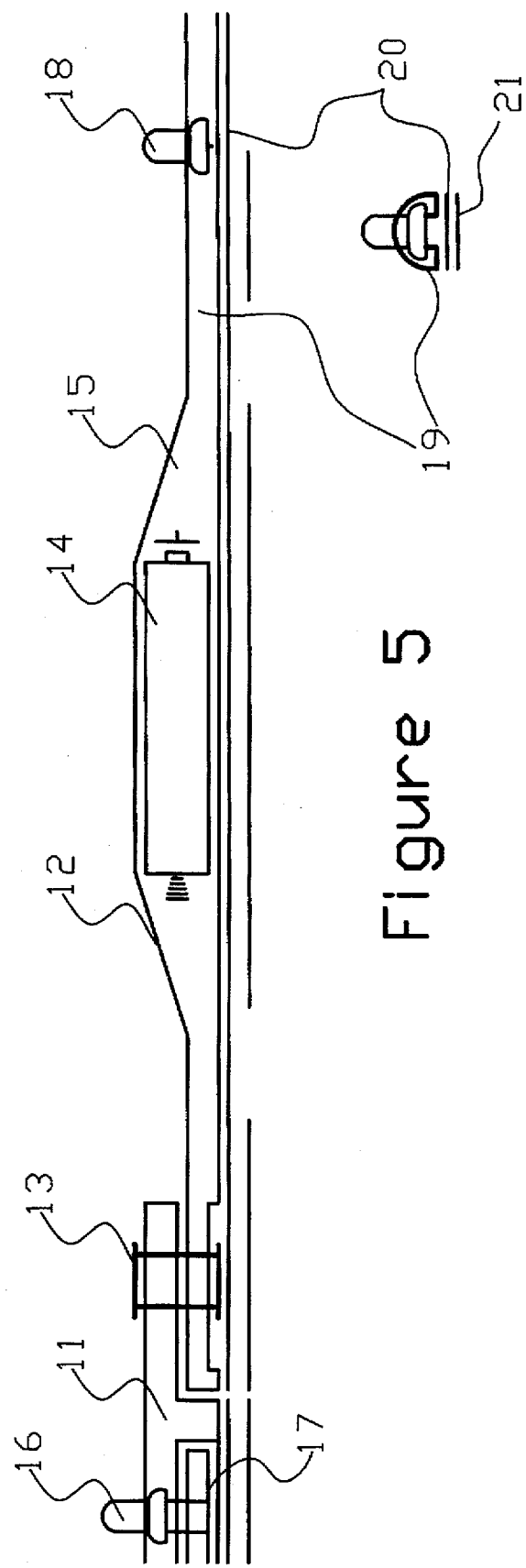

STRIP SPORT LIGHT

BACKGROUND OF THE INVENTION

The present invention relates to a safety flashlight, and more particularly to an illumination and safety flashlight having a thin and flexible strip-like elongated profile.

Flashlights or electrical torch lights serve illumination purposes for users. Typically, a flashlight has a rigid body which includes a light bulb and one or two battery cells. A manual ON/OFF switch turns "on" or "off" the flashlight to cause it to emit light when desired.

Some flashlights can generate a blinking light to attract the attention of nearby people or vehicles. Due to the rigid and irregular body shape of traditional flashlights, they can be easily carried by hand or mounted on a bicycle. Unfortunately, such flashlights are hard to mount on the helmet of a bicycle rider or to wear on the head of a jogger. Further, a centralized blinking light source can be easily blocked by the helmet body or by the jogger's head, which makes the light difficult to see.

Although traditional rigid flashlights have various advantages such as utility and low price, they are not without drawbacks for certain applications. Thus, there exists a need for a new type of flashlight that can be easily mounted on the helmet of a bicycle rider or that can be worn on the head of a jogger and still serve both illumination and safety purposes.

SUMMARY OF THE INVENTION

The present invention provides a flexible strip-like elongated light to serve both illumination and safety purposes. This strip sport light includes a "center strip" and two "arm strips".

The center strip body houses an electronic circuit board which has a three-step push button switch and several illumination light sources directly mounted on it. The light sources and the switch are exposed to the outside of the center strip body housing. The switch has the following three setting positions: "ON", "OFF" and "BLINK". The illumination light sources can be turned on by setting the switch to the "ON" position. It can also be turned off by setting the switch to the "OFF" position. When the switch is setting to the "BLINK" position, all the light sources on both "arm strips" will start blinking.

The two arm strips are mechanically and electrically identical. The arm strip body is made of a soft material, so that it is flexible. The arm strips are connected to the left and right side of the center strip body through a round connector. These round connectors make the arm strips easily adjustable to a preferable angle relative to the center strip, so that the combination strip sport light is easily attached along the contour of a helmet surface through "hook and loop fasteners". Each arm strip body houses one or more electrical energy sources and has several light sources distributed along its length. The energy sources and the light sources of both arm strips are electrically connected to the light sources and the three-step push button switch of the center strip. When the switch is set to the "BLINK" position, these light sources on the arm strips start blinking. These distributed blinking lights, if mounted properly on a bicycle driver's helmet, or worn on the head of a jogger, will catch the attention of the drivers of the surrounding vehicles. The blinking lights normally will not be blocked by the helmet body or by the jogger's head. Preferably, the light sources on the arm strips are colored —and more preferably they are made of LED's (Light Emitting Diodes).

The preferable electrical energy sources are commonly used commercial dry cell batteries. In the preferred embodiments, the electrical energy sources are size "AAA" or "AA" dry cell batteries.

A further understanding of the nature and advantages of the invention will become apparent by reference to the remaining portion of the specification and drawings.

BRIEF DESCRIPTION OF THE DRAWINGS

FIG. 5 shows a perspective side view of the juncture of the center strip and the right arm strip.

FIG. 6 shows the cross-sectional view of an LED light source in the arm strip body.

DESCRIPTION OF SPECIFIC EMBODIMENTS

Figure 1:
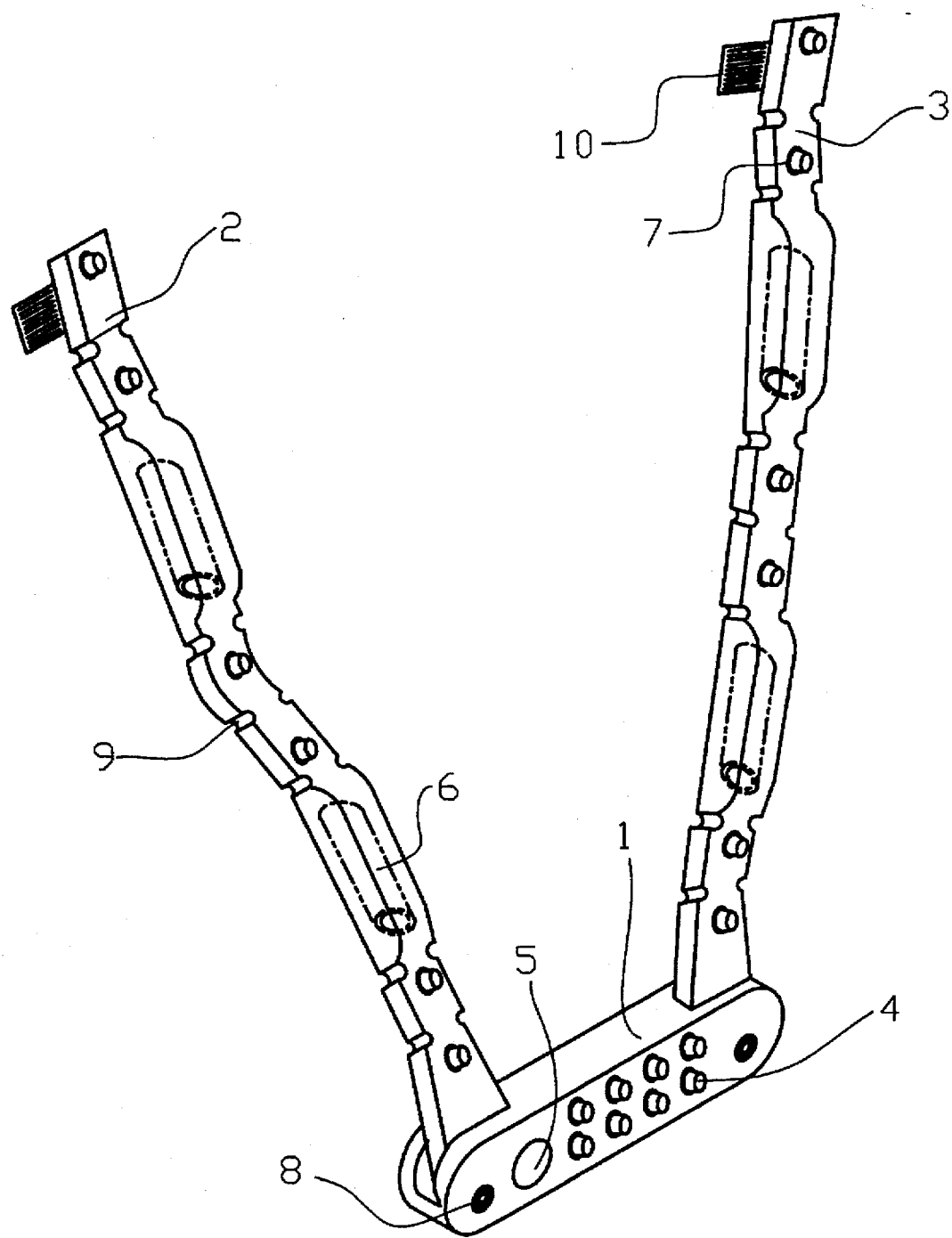
FIG. 1 shows a perspective view of a strip sport light according to the present invention.

Referring to FIG. 1, a strip sport light of the present invention includes a center strip 1, a left arm strip 2 and a right arm strip 3. The center strip body includes several illumination light sources 4 and a three-step push button switch 5. On the left arm strip, a dry cell battery 6 is enclosed in an aerodynamically designed battery housing. Several safety lights sources 7 are shown on the right arm strip. The round connector 8 shows the rotating connection between the arm strips and the center strip. In order to make both arm strips easily bent to conform to the contour surface of a helmet, there are "U-shaped cuts" 9 made along the edge of each arm strip. A "hook tape" fastener 10 is also shown on the end portion of each arm strip to provide an easy head mounting fastening method.

Preferably, the body housing of the center strip and arm strips is made from a soft material that provides flexibility for better attachment to a helmet surface. In preferred embodiments, the body housing of the center and arm strips will be made from PVC or rubber, but a variety of other suitable materials may be used.

The arm strip length (distance from round connector to the free end) is preferably long enough to fit any longitude of a standard bicycle helmet. In preferred embodiments, the length of the arm strip is between 10 and 15 inches. The arm strip average width (distance from left edge to right edge without counting the U-shaped cuts) is preferably between 0.25 inch to 0.75 inch.

The center strip length (distance from left end to the right end) is preferably between 2 and 3 inches. The center strip width (distance from top edge to bottom edge) is preferably setting between 0.5 inch to 1.5 inch.

The three-step push button switch 5 operates in three modes: (1) Illumination Mode—When the switch is set to the "ON" position, it will turn on the illumination light sources on the center strip. (2) Blinking Mode—When the switch is set to the "BLINK" position, all the light sources on both arm strips will start blinking. (3) OFF mode—When the switch is set to the "OFF" position, all light sources will be turned off. It is recognized that any combination of light sources may be utilized for both the illumination blinking functions.

Preferably, illumination light sources 4 on the center strip will be an array of light emitting diodes (LED's), but may also be a lamp(s) or other conventional light sources. The preferred LED color for the center strip is yellow or green. In a preferred embodiments, the number of illumination LED's will be between 2 and 10.

The distributed light sources on the arm strips 7 are provided for safety purpose. These light sources will flash on and off while switch 5 is setting on the "BLINK" position. Preferably, safety light sources 7 on both arm strips will be an array of light emitting diodes (LED's), but may also be a lamp(s) or other conventional light sources. The preferred LED colors are red, or orange. The LED's may be all in a single color, or may be several colors. In preferred embodiments, the number of safety light sources on each arm strip will be between 1 and 10.

U-shaped cuts located on the arm strips provide additional flexibility to the arm strips. The number of U-shaped cuts can be varied. Preferably, the number of U-shaped cuts on each arm strip is between 2 and 30.

Figure 2:
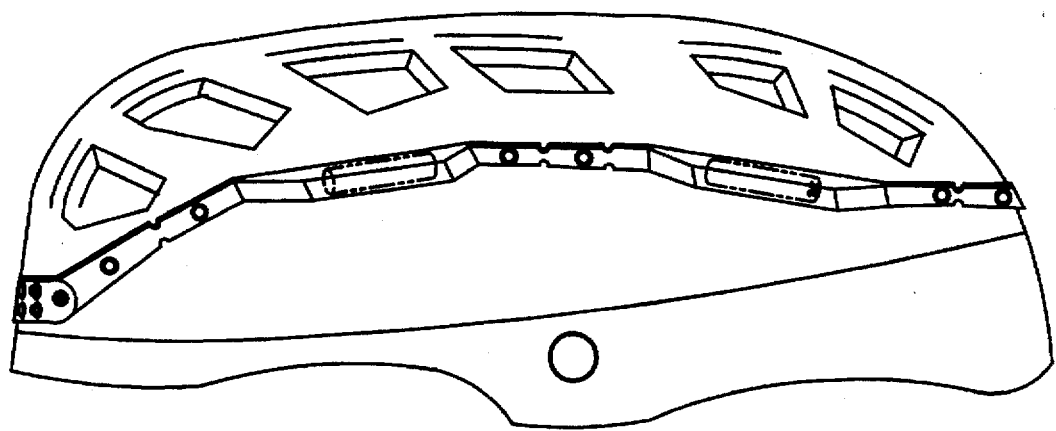
FIG. 2 shows a side view of a strip sport light mounted on a bicycle helmet.

FIG. 2 shows a side view of a strip light mounted on a bicycle helmet. Preferably, the method of attachment of the strip light and the helmet surface is double-sided glue tape. In other preferred embodiments, "hook and loop fasteners" will be used for removable attachment between the strip light and the helmet.

FIG. 5 is a perspective side view of the juncture of the center strip and the right arm strip. Center strip 11 is connected to right arm strip 12 through a round connector 13. Any suitable metal connector can be used for this connection. There are variety of metal connectors may be used for this purpose. In preferred embodiments, the connector will be part of either the center strip or the arm strip. If the connector is part of the center strip, the corresponding position on each arm strip would be a hole. If the connector is part of the arm strip, the corresponding position on the center strip is a hole.

Electrical energy source 14 is enclosed in an aerodynamic housing 15 of the arm strip. In preferred embodiments, the electrical energy source will be either "AAA" or "AA" sized industrial standard dry cell batteries.

Illumination light source 16 mounted on an electronic printed circuit board (PCB) 17 is also shown in FIG. 5.

FIG. 6 shows the cross-sectional view of a safety blinking light source 18 that is mounted in the arm strip body 19. The arm strip is also equipped a loop fastener 20 and a hook fastener 21 to provide an easy and removable attachment of the strip sport light to a bicycle helmet.

Figure 3:
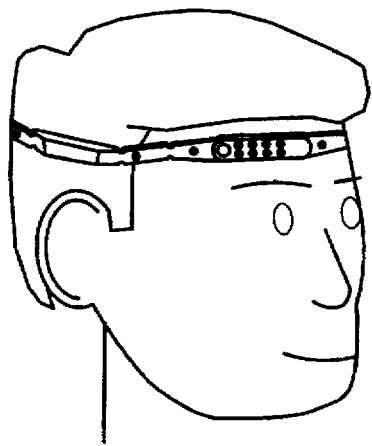
FIG. 3 shows a front view of a head mounted strip sport light.
Figure 4:
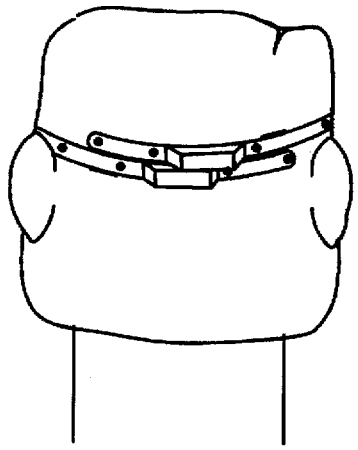
FIG. 4 shows a back view of a head mounted strip sport light.

For head mounting applications, loop fastener 20 of each arm strip can be fastened to the hook fastener 10 (see FIG. 1) of the other arm strip to secure the strip sport light on a user's head (see FIG. 3 and FIG. 4).

I claim:

1. A strip sport light comprising:

a center strip body including an electronic printed circuit board, a switch, at least one light source, and two arm strip bodies, each said arm strip body including at least one electrical energy source and a plurality of light sources;

wherein said two arm strip bodies are connected to said center strip body such that said arm strip bodies rotate relative to said center strip body through an angle of between 90 to 180 degrees; and wherein said printed circuit board electronically connects said energy sources with said switch and said at least one light source on said center strip body and said light sources on said arm strip bodies such that said switch is able to perform the following three functions:

(a) illumination—said light sources on said center strip body are turned on;

(b) blinking—multiple light sources on both arm strips start flashing on and off;

(c) shut off—all said light sources are turned off.

2. The strip sport light of claim 1 wherein:

said light sources are LED's.

3. A strip sport light comprising:

a center strip body including an electronic printed circuit board, a switch, at least one light source, and two arm strip bodies, each said arm strip body including at least one electrical energy source and a plurality of light sources;

wherein said two arm strip bodies are connected to said center strip body such that said arm strip bodies rotate relative to said center strip body through an angle of between 90 to 180 degrees; and wherein the arm strip bodies are made from soft material and have multiple U-shaped cuts distributed along the length of said arm strip bodies to increase flexibility of said arm strip bodies.

4. The strip sport light of claim 3 wherein:

said light sources are LED's.

* * * * *